: (12) United States Patent
Dreier et al.

(10) Patent No.: US 11,424,667 B2
(45) Date of Patent: Aug. 23, 2022

(54) METHOD FOR INTRODUCING INSULATING FILM AND AT LEAST ONE ELECTRICAL CONDUCTOR

(71) Applicant: GROB-WERKE GmbH & Co. KG, Mindelheim (DE)

(72) Inventors: Günter Dreier, Deisenhausen (DE); Ralf Rauscher, Fellheim (DE); Korbinian Seidel, Mindelheim (DE); Veronika Schaller, Kaufbeuren (DE); Martin Otter, Memmingen (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 727 days.

(21) Appl. No.: 16/062,394

(22) PCT Filed: Dec. 15, 2016

(86) PCT No.: PCT/EP2016/081253
§ 371 (c)(1),
(2) Date: Jun. 14, 2018

(87) PCT Pub. No.: WO2017/102981
PCT Pub. Date: Jun. 22, 2017

(65) Prior Publication Data
US 2020/0280248 A1 Sep. 3, 2020

(30) Foreign Application Priority Data

Dec. 15, 2015 (DE) ..................... 10 2015 121 883.6
Jun. 22, 2016 (DE) ..................... 10 2016 111 481.2

(51) Int. Cl.
*H02K 15/10* (2006.01)
*H02K 3/34* (2006.01)

(52) U.S. Cl.
CPC ........... *H02K 15/105* (2013.01); *H02K 3/345* (2013.01)

(58) Field of Classification Search
CPC ...... H02K 15/10; H02K 15/105; H02K 3/345; H02K 15/00
See application file for complete search history.

(56) References Cited

U.S. PATENT DOCUMENTS 2,455,862 A 12/1948 Goldberg
5,952,761 A 9/1999 Itoh et al.
(Continued)

FOREIGN PATENT DOCUMENTS

CN 102474147 A 5/2012
EP 1 109 293 A2 6/2001
(Continued)

OTHER PUBLICATIONS

Chinese Office Action, dated Sep. 4, 2019 (18 pages).
International Search Report, dated Apr. 12, 2017 (3 pages).

*Primary Examiner* — Peter Dungba Vo
*Assistant Examiner* — Jose K Abraham
(74) *Attorney, Agent, or Firm* — Jacobson Holman PLLC

(57) ABSTRACT

A method for inserting electrical conductors in slots of a component, wherein, in sections, an insulating film has two legs which are connected by a V-shaped or folded tip region. The legs lie against the slot edges such that damage to the electrical conductors by edges of the slot during the insertion thereof into the slots is avoided. The invention further relates to an associated device, to an associated cutting tool, and to an associated use.

14 Claims, 11 Drawing Sheets

(56) References Cited

U.S. PATENT DOCUMENTS

| | | | |
|---|---|---|---|
| 6,400,056 B1 * | 6/2002 | Naka | H02K 3/345 310/215 |
| 2002/0014806 A1 * | 2/2002 | Senoo | H02K 15/10 310/215 |
| 2002/0038505 A1 * | 4/2002 | Luttrell | H02K 15/10 29/596 |
| 2002/0047486 A1 * | 4/2002 | Asao | H02K 3/345 310/263 |
| 2004/0189134 A1 * | 9/2004 | Onishi | H02K 3/345 310/215 |
| 2005/0146238 A1 * | 7/2005 | Morikaku | H02K 3/30 310/215 |
| 2006/0261699 A1 * | 11/2006 | Nishimura | H02K 1/148 310/215 |
| 2012/0117790 A1 * | 5/2012 | Carpentier | H02K 15/063 29/596 |
| 2012/0293037 A1 * | 11/2012 | Uchida | H02K 3/487 310/214 |
| 2015/0244230 A1 * | 8/2015 | Yoon | H02K 15/105 310/215 |
| 2017/0047796 A1 * | 2/2017 | Darras | H02K 1/16 |

FOREIGN PATENT DOCUMENTS

| | | | | |
|---|---|---|---|---|
| EP | 1109299 A2 * | 6/2001 | | H02K 15/066 |
| EP | 1 178 587 A2 | 2/2002 | | |
| FR | 3 020 195 A1 | 10/2015 | | |
| FR | 3020215 A1 * | 10/2015 | | H02K 15/10 |
| JP | 3621633 B2 * | 2/2005 | | H02K 15/066 |
| JP | 2006223063 A * | 8/2006 | | |
| JP | 2013-143819 A | 7/2013 | | |
| KR | 101173079 B1 * | 8/2012 | | H02K 15/02 |
| KR | 20140095667 A * | 1/2013 | | |
| KR | 20140095667 A * | 8/2014 | | H02K 15/10 |
| WO | WO 2011000103 * | 1/2011 | | H02K 15/00 |
| WO | 2015/15 8992 A1 | 10/2015 | | |
| WO | WO-2015158988 A2 * | 10/2015 | | H02K 1/16 |

* cited by examiner

METHOD FOR INTRODUCING INSULATING FILM AND AT LEAST ONE ELECTRICAL CONDUCTOR

BACKGROUND OF THE INVENTION

The invention relates to a method for introducing insulating film and at least one electrical conductor into a slot of a component, for example a stator for an electrical machine. The invention further relates to an associated device, to an associated cutting tool, and to an associated use.

Electrical conductors of electrical machines, in particular electric motors, are typically inserted in slots of a stator and insulated with respect to the stator by means of an insulating film. However, it has been shown that damage frequently occurs when inserting electrical conductors of this kind.

SUMMARY OF THE INVENTION

It is therefore an object of the invention to provide a method as well as an associated device, an associated cutting tool and an associated use which avoid damage of this kind.

According to the invention, this is achieved by a method, a device, a cutting tool and a use according to the respective main claims. Advantageous embodiments can be seen, for example, from the respective sub-claims.

The invention relates to a method for introducing insulating film and at least one electrical conductor into at least one slot of a component, for example a stator for an electrical machine.

The method has the sequence of the following steps:
Provision of at least one insulating film which has been obtained as a section from a supply of insulating film and which, in cross section, has, at least in sections, at least one V-shaped or folded tip region bounded by two legs, wherein the insulating film has a leading and trailing edge in the direction perpendicular to the V-shaped tip region.
Introduction of the insulating film into the component in such a way that the V-shaped tip region of the insulating film projects into the at least one slot and the legs rest against the slot edges, and
Introduction of at least one electrical conductor into the slot.

The V-shaped form of the tip region has the effect that, as a result of this funnel-shaped form of the tip region, the individual electrical conductors which are subsequently fed into the slot enter the slot in an orderly and guided manner.

However, this is not the only advantage of this proposal!

The insulating film proposed according to the invention having a V-shaped tip region is characterized in its tip region by two legs which together enclose the tip angle.

The insulating film having a V-shaped tip region lines the usually U-shaped slot when the electrical conductors are inserted in the slot. In this respect, the insulating film is flexible in order to adapt to this shape.

The slot is defined by slot width and slot depth. The legs are longer than the slot depth; the insulating film therefore projects out of the slot. The slot angle is now chosen such that the legs rest against the slot edges or edges terminating the slot, and the V-shaped tip region widens further outside the slot, as a result of which the edges are protected/hidden.

The proposal according to the invention therefore combines an improved methodology for inserting the electrical conductors in the slot, as these are guided in a locational manner, with a clear improvement in the protection of the electrical conductors, as these now no longer rest against the sharp-edged slot edge where they can sustain damage.

In a further preferred embodiment of the invention, it is provided that the insulating film is introduced into the slot in such a way that respective edges of the slot are covered by the insulating film.

Covering the edges effectively prevents damage to the electrical conductors during the introduction thereof into the respective slot. Such an embodiment can be realized both with the variant in which the insulating film is designed as individual pieces and the variant in which the insulating film is designed as fanfold paper. Fanfold paper also has a leading and trailing edge; the fanfold paper has a very large number (therefore "endless", usually corresponding to the number of slots) of V-shaped or folded tip regions which have usually been obtained as a section from a supply of insulating film. This planar primary material then acquires the tip regions by folding, and is then flexed in order to enter the interior of the stator. According to the invention, it is possible to feed these V-shaped or folded tip regions into the slots of the stator/component in a radial and/or axial movement. The diameter of the inflection of the primary material is oriented towards the planned insertion movement. In the fitted state, the leading and trailing edges are located adjacent to one another, resting against or overlapping one another or in opposition to one another, spaced slightly apart.

An electrical machine can, in particular, be an electric motor, for example a powerful electric motor for an electric vehicle.

In an embodiment, during the step of introducing an insulating film, the insulating film is only introduced into the slot to such an extent that it is at a distance from a bottom of the slot. In particular, this enables the use of individual insulating films, that is to say typically one insulating film per slot.

During the step of introducing a number of electrical conductors, the insulating film can then preferably be pushed to the bottom of the respective slot by the electrical conductors. In this way, advantageously, parts of the insulating film which project from the slot can be drawn into the slot. This saves a further operation for removing or inserting the projecting parts. However, it is understood that the projecting parts can also be separately removed or inserted into the slot, for example folded.

It is to be understood that the term "insulating film" presents no limitation to the material. The term "insulating film" serves as an umbrella term for all insulating materials known to a person skilled in the art for this application, whether they be based on paper, for example, or on a plastic, for example a film plastic.

According to an embodiment, a separate insulating film is introduced into each slot. Here, the insulating film can preferably be pre-formed, in particular pre-folded, before it is introduced into the slot. This allows the method to be carried out easily and reduces the apparatus required.

Ingenuously, insulating films which have been introduced into adjacent slots overlap between these slots. This enables a common gripping or retention of two adjacent insulating films.

After the introduction thereof, the insulating films can preferably be held fast between respective slots. This prevents the insulating films slipping or falling out, in particular until the electrical conductors are introduced.

According to a preferred embodiment, the insulating films are released during the introduction of the electrical conductors to enable them to pass further into the respective slot. This enables the insulating films to be brought to the respective end position during the movement of the electrical conductors which occurs anyway.

According to an embodiment, during the step of introducing an insulating film, the insulating film is introduced as far as the bottom of the slot. In doing so, preferably, a common insulating film is introduced into a plurality of slots, preferably all slots of the component.

At the same time, the insulating film can in particular be designed as fanfold paper. This can be understood, for example, to mean a strip provided in greater length and/or in webs or layers which is sufficient for a considerable part of a stator or even for the whole stator.

According to a preferred embodiment, after the introduction thereof, preferably also after the introduction of the electrical conductors, the common insulating film is cut. In this way, for example, the parts of an insulating film projecting from the respective slot can be cut off or inserted into the slot, for example folded. Cutting can take place, in particular, along respective longitudinal directions of the slots.

Preferably, in doing so, after the step of introducing the electrical conductor, the insulating film can be folded so that it is located completely within the respective slot. This prevents a projection which could lead, for example, to uneven surfaces or damage.

According to a preferred embodiment, the cutting of the common insulating film and the folding of the insulating films are carried out in one operation, in particular by means of a single tool. This enables advantageously fast processing.

It is to be understood that the above-mentioned pre-forming or pre-folding of the insulating film can be used both when introducing individual insulating films and when using a common insulating film. In the first case, a top-hat shape can be used for example. In the second case, a meandering shape can be used for example. Alternatively, it is however also possible, for example, to use a non-preformed insulating film and to form it appropriately only when it is introduced into the slot.

The stator is typically round. The insulating films and the electrical conductors are preferably introduced radially from the inside to the outside. This enables a radially symmetrical embodiment to be achieved which allows the method to be carried out easily and simultaneously.

According to a development, after the step of introducing the electrical conductor, in particular after folding the insulating film in the slot, the method further has the following step:

Introduction of a respective slot cover into the slot, wherein the slot cover covers the electrical conductors introduced into the slot.

In particular, the slot cover can safeguard the electrical conductors which are located in the slot against contamination or damage. The penetration of foreign bodies can also be prevented.

Preferably, the respective slot cover seals the slot. This allows an advantageous closure.

According to an embodiment, in the case of the method, it is provided that the slot covers are inserted axially. This has proved to be advantageous, particularly as appropriate devices can be positioned adjacent to the component. Alternatively however, the slot covers can also be inserted radially.

The insulating film can be introduced in the form of a slotted rosette. However, it can also be introduced in the form of a continuous rosette.

In a further variant, it is provided that the rosette-like insulating film has a multiplicity of V-shaped tip regions which are connected directly to one another or in each case to a connecting region.

According to an advantageous embodiment, after the introduction thereof, the insulating film is stiffened and parts which lie outside the slots are removed by a machining process.

The invention further relates to a device for introducing electrical conductors into slots of a component, for example a stator for an electric motor. The device has a number of slot pushers for introducing electrical conductors into the slots, and a number of guide elements arranged between the slot pushers for laterally guiding the electrical conductors during their introduction.

Preferably, the device is designed to carry out a method according to the invention. In doing so, recourse can be made to all embodiments and variants described.

The device according to the invention allows, in particular, the automated execution of all or most steps of a method according to the invention. In doing so, in particular the slot pushers can each be assigned to one slot. The slot pushers can insert respective electrical conductors in a particular slot. At the same time, the guide elements can stabilize the electrical conductors, particularly at right angles to their direction of movement.

Preferably, the slot pushers can be moved radially with respect to a common axis. In particular, this allows the already mentioned radial execution of the method.

According to an embodiment, the guide elements can be moved radially or parallel to surrounding slot pushers in order to hold or release insulating films between the slots. In this way, in particular the execution of the method in the alternative with individual insulating films per slot can be carried out advantageously. Reference is made to the above comments in this regard. However, the guide elements can also be rigid, which in particular is adequate typically for the execution of the method in the alternative with a common insulating film.

The invention further relates to a cutting tool which has a base body, a first cutting knife and a second cutting knife, wherein the first cutting knife and the second cutting knife project from the base body so that they are constructed to cut through a common insulating film adjacent to a slot of a component along two adjacent, parallel cutting lines. By means of such a cutting knife, a common insulating film between two slots can be cut particularly advantageously, as has been mentioned above with reference to the method according to the invention.

According to a development, the cutting tool can further be designed to fold parts of the insulating film resulting from the cutting process into the slot after cutting. This enables the advantages mentioned above with reference to the folding to be achieved in one operation.

Advantageously, the cutting tool can be part of a device according to the invention. This allows a particularly high degree of integration.

The invention further relates to an insulating film having a multiplicity of in each case parallel-running fold lines, wherein a cutout which is arranged in a bending region extends between two fold lines. If two (parallel) fold lines are located between two cutouts, then a U-shaped tip region is formed. If only one fold line is located between two cutouts, then a V-shaped tip region is formed.

The invention further relates to an insulating film having at least one, in cross section, V-shaped or folded tip region and which has been obtained as a section from a supply of insulating film, wherein the insulating film has a leading and trailing edge in the direction perpendicular to the V-shaped tip region.

The invention further relates to a use of an insulating film, having, in cross section, at least in sections, at least one V-shaped or folded tip region for insulating the slot of a component, for example of a stator of an electrical machine, with respect to the at least one electrical conductor which is provided for inserting in the slot.

As already described, the tip region is formed by two legs, wherein it is provided that the sum of the two leg lengths corresponds at least to the slot width plus twice the slot depth. Such an embodiment guarantees that, when starting to feed-in the electrical conductor, the insulating film is opened out over the width of the slot in the form of a funnel and guides the electrical conductor and, when the slot is completely filled with electrical conductors, the insulating film still reaches at least to the slot edge.

If an arrangement is chosen in which the sum of the leg lengths is just equal to the mean slot width and twice the slot depth, then a projection of the insulating film above the slot is avoided.

In doing so, it is provided that the folding or bend lines in the V-shaped tip region in the insulating film which is designed as fanfold paper run parallel.

This enables the advantages described above.

At the same time, the insulating film can advantageously be pre-formed, in particular pre-folded. For example, it can be provided for a plurality of slots, wherein, in particular, it can be folded in a meandering manner. It can also be provided for one slot, wherein, for example, it can be folded in a top-hat shape.

The invention further relates to a stator, preferably consisting of a lamination stack which has a multiplicity of slots for accommodating electrical conductors, wherein an insulating film having a multiplicity of fold lines each running in parallel is inserted, at least in sections, in the slots, between the electrical conductors and the slot walls and slot bottom which in each case border the slots, wherein a cutout which is arranged in an inflection region extends between two fold lines in such a way that the fold line is located at the slot bottom and the cutout is located at the slot tooth separating the respective slots. Side regions, which connect and stabilize the regions of the insulating film which are inserted in adjacent slots, adjoin the cutouts.

The slots are separated from one another by slot teeth. The slot walls in each slot are in each case parallel; the slot bottom connects the slot walls and attaches thereto at right angles. The respective center axes of the slots are oriented radially, for example with respect to the axis of rotation. This slot area, which is as near as possible rectangular in aspect, is preferably filled with electrical conductors in the form of rectangular wire (viewed in cross section). This leads to a high filling quota, which is desirable in such stators or electrical machines. Here, the rectangular wires are inserted in the slot next to one another in one, two, three or more rows, if possible over the whole slot width (up to the sealing slot cover, etc.). The insertion of the electrical conductors is preferably carried out in packets, i.e. all conductors per slot in one insertion movement, and preferably all slots of the stator are filled simultaneously.

In this context, it is particularly pointed out that all features and characteristics described with regard to the different devices (cutting device, insulating film, stator), and also avenues of approach, can also be transferred accordingly with regard to the formulation of the method according to the invention and can be used within the meaning of the invention, and are seen as being also disclosed. The same also applies in the reverse direction; this means that constructional features, that is to say features pertaining to the device, only mentioned with regard to the method can also be taken into account and claimed within the framework of the device claims (cutting device, insulating film, stator), and are likewise included in the disclosure.

BRIEF DESCRIPTION OF THE DRAWINGS

The invention is shown schematically in the drawing, in particular in an exemplary embodiment. In the drawing:

FIG. 1 consists of FIGS. 1A and 1B,

FIG. 2 consists of FIGS. 2A, 2B, 2C and 2D,

FIG. 3 consists of FIGS. 3A, 3B, 3C and 3D,

DETAILED DESCRIPTION OF THE DRAWINGS

In the figures, identical or corresponding elements are in each case designated by the same references and, unless expedient, are therefore not described again. The disclosures contained in the overall description can be transferred analogously to identical parts with the same references or same component designations. The positional information chosen in the description, such as for example top, bottom, side etc., relates to the figure directly described and shown, and in the event of a positional change, is to be conferred analogously on the new position. Furthermore, individual characteristics or combinations of characteristics from the different exemplary embodiments shown and described can also constitute independent, inventive solutions or solutions according to the invention in their own right.

Figure 1A:
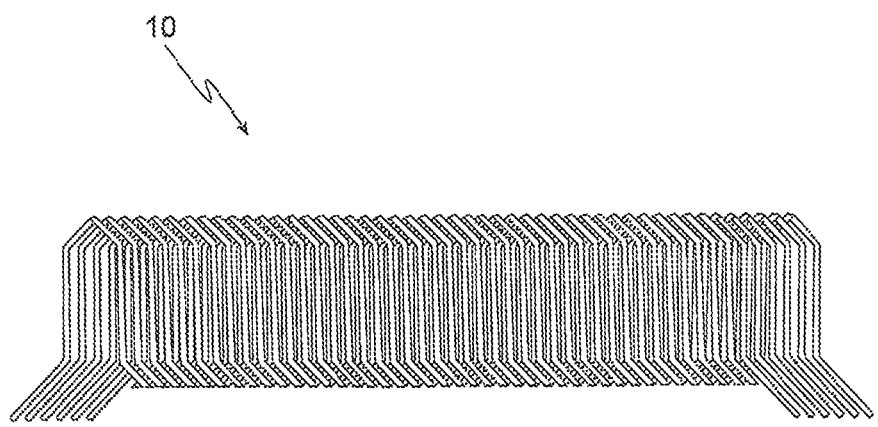
FIG. 1A which shows an arrangement of electrical conductors.

FIG. 1A shows an arrangement of electrical conductors 10 which can be used within the framework of a method according to the invention. It is to be understood that this diagram is merely schematic and clearly deviating embodiments of electrical conductors 10 can also be used.

Figure 1B:
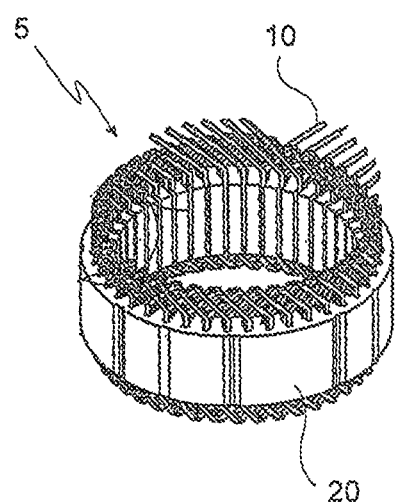
FIG. 1B which shows a stator arrangement.

FIG. 1B shows a stator arrangement 5 which, for example, can be produced by means of a method according to the invention. The stator arrangement 5 has a stator 20 and an arrangement of electrical conductors 10 fitted thereto or therein. The electrical conductors 10 are, in particular, accommodated in slots of the stator 20 as will be described in detail below.

FIGS. 2A to 2D show states during a method according to the invention according to a first exemplary embodiment.

Here, it can be seen that a number of slots 22 are formed in a stator 20. Insulating films 30 and electrical conductors 10 are to be introduced into these slots 22. The variant of the method shown in FIGS. 2A to 2D is such that a separate insulating film 30 is introduced into each slot 22.

A device 100 for introducing electrical conductors according to an exemplary embodiment of the invention is provided for carrying out the method according to the invention. The device 100 has a number of slot pushers 110 which can each be moved along a respective direction of movement 112. In doing so, each slot pusher 110 is assigned to a particular slot 22.

Respective guide elements 120, which stabilize the electrical conductors 10 against lateral movement during insertion into the slots 22, are located between the slot pushers 110. In the embodiment shown here, the guide elements 120 are designed such they can likewise be moved.

The directions of movement of the slot pushers 110 and the guide elements 120 are directed outward from a central axis which is not shown. This can be seen in FIGS. 2A to 2C in as much as a slight curvature of the stator 20 is shown and the indicated directions of movement, which are shown by the arrows, match this curvature.

A respective insulating paper 30 or insulating film 30 has already been introduced into each of the slots 22. Here, as shown, the respective insulating paper 30 has only been introduced into the respective slots 22 to an extent that it is still clearly at a distance from the bottom of the slot 22. Insulating papers 30 of respective adjacent slots 22 in each case overlap one another as shown, between the slots 22.

Figure 2A:
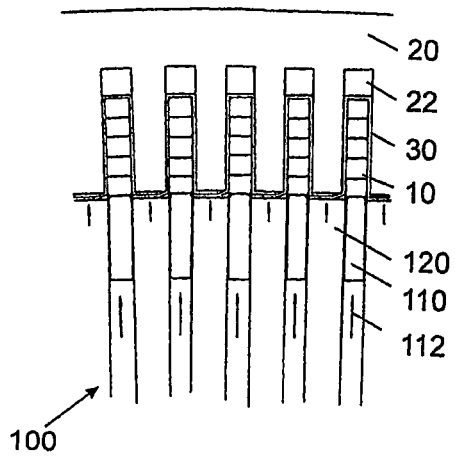
FIG. 2A to 2D show states in a method according to the invention according to a first exemplary embodiment.

In the state shown in FIG. 2A, the respective overlapping parts of the insulating papers 30 are held by the guide elements 120. The guide elements 120 are pre-tensioned in the direction of the stator 20 for this purpose. This allows the electrical conductors 10 to be inserted without the risk of the insulating films 30 slipping or falling out.

In the state shown in FIG. 2A, the electrical conductors 10 have already been introduced into the slots 22 to an extent that they are located completely within the respective slots 22 and fill the space which is bounded from the opening outward by the respective insulating films 30. This occurred by actuating the respective slot pushers 110 in order to push the electrical conductors 10 radially outward.

From the state shown in FIG. 2A, the slot pushers 110 were moved further outward, wherein at the same time the guide elements 120 were withdrawn slightly in order to release the insulating films 30. This results in the state shown in FIG. 2B.

The slot pushers 110 are then likewise withdrawn so that they are located outside the slots 22. Slot covers 40, which cover the electrical conductors 10 on the outside, are then introduced into the respective slots 22. These are introduced, in particular, in the axial direction, but can also be introduced in the radial direction.

Figure 2B:
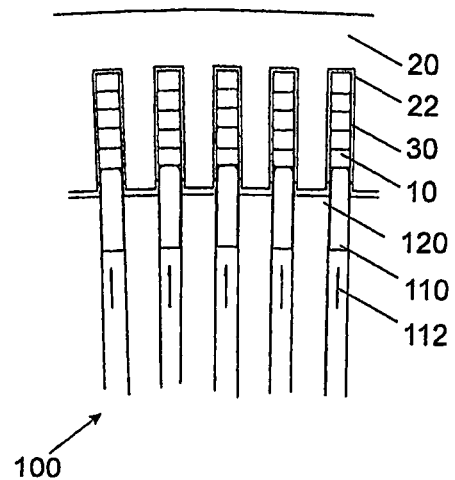
Figure 2C:
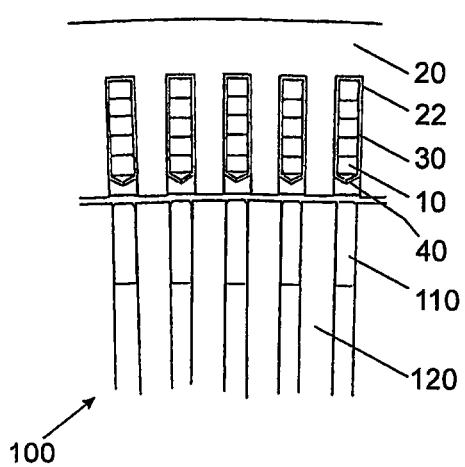
Figure 2D:
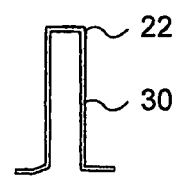

FIG. 2D shows separately a state of a slot 22 with introduced insulating film 30. This reaches to the bottom of the slot 22 and projects above the edges of the slot 22.

It must be pointed out that, with the method according to the invention, the use of insulating films 30 which cover the edges of the respective slots 22 effectively prevents damage to the electrical conductors 10 during insertion into the slots 22. With embodiments according to the prior art, these edges were typically free so that damage could result in the event of even only slight slipping of the electrical conductors 10. With the method according to the invention, this is prevented by the embodiment described, which considerably reduces the reject quota during the production of stator arrangements.

FIGS. 3A to 3D show a modification of the method according to the invention according to a second exemplary embodiment. Here, essentially, the differences from the first exemplary embodiment are discussed below. Reference is made to the above description of the first exemplary embodiment with regard to details not enlarged upon below.

In contrast to the first exemplary embodiment, a continuous insulating film 30 is used in the second exemplary embodiment. Individual insulating films 30 are therefore no longer used for the respective slots 22 from the very beginning. The insulating film 30 is shown in FIG. 3D. As can be seen, here the insulating film 30 is already pre-formed so that it fits ideally into the slots 22. It is designed, in particular, as fanfold paper.

Figure 3A:
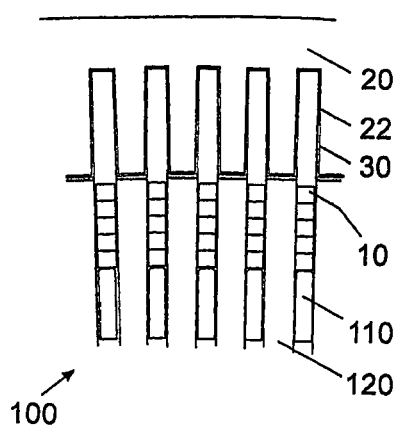
FIG. 3A to 3D show states in a method according to the invention according to a second exemplary embodiment.
Figure 3B:
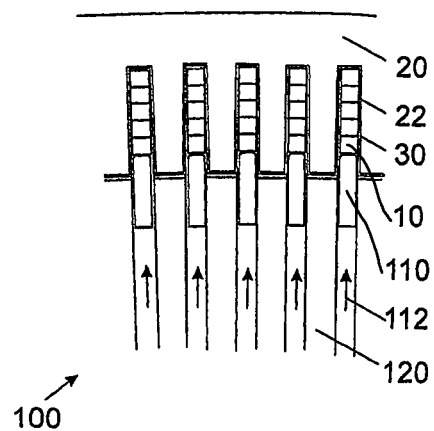

FIG. 3A shows a state in which this insulating film 30 has been inserted into the slots 22. In doing so, the insulating film 30 in each case reaches the bottom of the respective slot 22. In this state, the electrical conductors 10 are still arranged outside the slots 22 and, from the process point of view, are therefore still prior to that state which is shown in FIG. 2A.

For carrying out the method according to the second exemplary embodiment, the device 100 is also modified in comparison with the device 100 for carrying out the method according to the first exemplary document. A device 100 according to a second exemplary embodiment is therefore also shown in FIGS. 3A to 3C. Here, in contrast to the first exemplary embodiment, the guide elements 120 are not movable, that is to say they are rigidly designed. This is because, when using a continuous insulating film 30 as is the case in the second exemplary embodiment, it is not necessary to firmly hold overlapping regions of insulating films of adjacent slots. Rather, the insulating film 30 which is used in the second exemplary embodiment remains in the slots 22 of its own accord.

However, it must be mentioned that, basically, the device 100 according to the first exemplary embodiment shown in FIGS. 2A to 2C can also be used for carrying out the method according to the second exemplary embodiment. Here, for example, the guide elements 120 can be left withdrawn, or alternatively the holding process can be carried out, which, although it is typically unnecessary when carrying out the method according to the second exemplary embodiment, it does not normally cause any damage.

Starting from the state shown in FIG. 3A, the electrical conductors 10 are pushed radially outward into the respective slots 22 by the slot pushers 110. This results in the state shown in FIG. 3B in which the electrical conductors 10 move to the respective bottom of the respective slot 22 which is lined with the insulating film 30.

As a result of the insulating film 30, which also covers the respective edges of the slots 22 in the second exemplary embodiment, damage to the electrical conductors 22 by the edges is effectively prevented. This represents a significant advantage compared with embodiments according to the prior art.

Figure 3C:
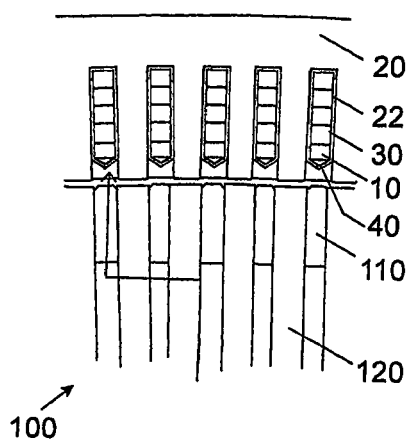
Figure 3D:

FIG. 3C shows a state in which the slot pushers 110 have been withdrawn from the slots 22. Also, in a similar way to the state of FIG. 2C, slot covers 40 have been introduced into the slots 22 in order to cover the electrical conductors 10.

Furthermore, it must be noted that, between the states shown in FIG. 3B and FIG. 3C, the continuous insulating film 30 has in each case been cut between the slots 22. This results in individual insulating films 30 similar to the first exemplary embodiment. However, these insulating films are not drawn completely into the slots 22 when introducing the electrical conductors 10 but are in each case folded such that they are located only within the respective slot 22. This is shown in detail below with reference to FIG. 4b.

Mention must be made of the fact that in each case five adjacent electrical conductors 10 are shown in the figures. However, any other number can also be used, for example 1, 2, 3, 4, 6, 7, 8, 9, 10 or even more than 10 electrical conductors.

Figure 4A:
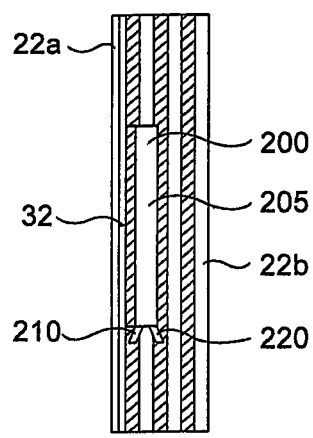
FIG. 4 consists of FIG. 4A which shows a cutting tool in use.
FIG. 4B which shows a folding process.

FIG. 4A shows a cutting tool 200. The cutting tool 200 has a base body 205, a first cutting knife 210 attached thereto and a second cutting knife 220 likewise attached to the base body 205. The two cutting knives 210, 220 project from the base body 205 at one end thereof in such a way that they cut along respective cutting lines parallel to one another when the base body 205 is moved along its longitudinal direction.

In the state shown in FIG. 4A, the cutting tool 200 is arranged between a first slot 22a and a second slot 22b. Here, the first slot 22a is, in particular, a closed slot, while the second slot 22b is, in particular, an open slot. This enables an insulating film 30 to be cut. The insulating film 30 can then be folded along a fold 32. This is described in detail below with reference to FIG. 4B.

Figure 4B:
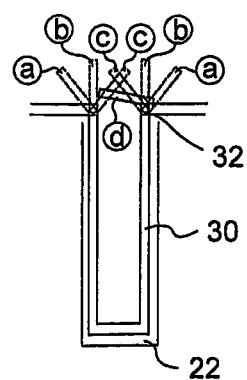

FIG. 4B shows a slot 22 with inserted insulating film 30. The insulating film 30 is designed to be folded at a fold 32 and initially projects above the slot 22. A total of four states, which are each specified by encircled numbers, are also shown in FIG. 4B, as a result of which it is shown how the insulating film 30 can be moved completely into the slot 22. It can be seen that, with increasing numbers or letters of the shown states, the next outward lying parts of the insulating film 30 are folded further inward so that they are finally located completely within the slot 22. It is to be understood that such a process can be initiated in particular by a suitable design of the base body 205 of the cutting tool 200.

Figure 5A:
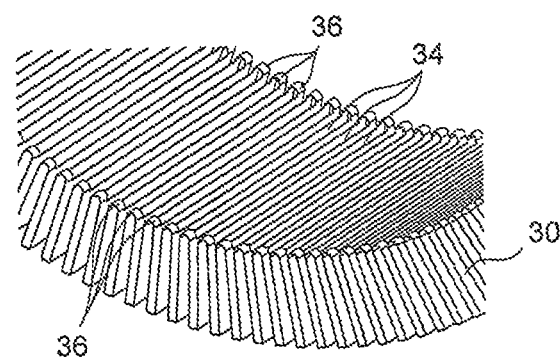
FIG. 5 consists of FIGS. 5A, 5B and 5C, and each show an insulating film.

FIG. 5A shows in perspective an insulating film 30 according to an embodiment in a state before installation. The insulating film 30 has a number of cutouts 34 which are arranged internally viewed in an axial direction. Mention must be made of the fact that the insulating film 30 can basically also be punched axially externally.

Respective side regions 36 are arranged axially to the side of the cutouts 34. In the installed state, these cover teeth of the stator 20 and fix the insulating film 30.

Figure 5B:
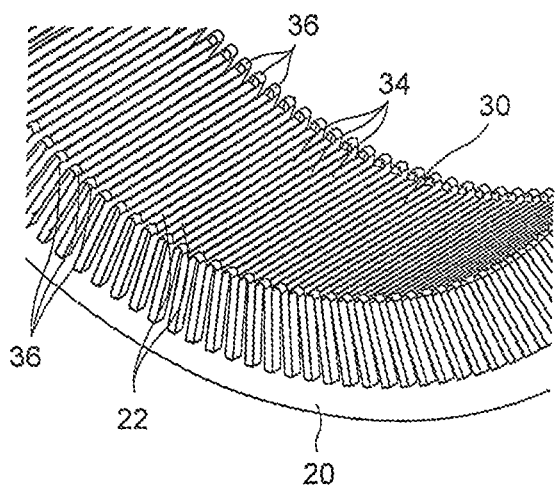

FIG. 5B shows the insulating film 30 of FIG. 5A in the installed state on a stator 5b. Here, it can be seen that the cutouts 34 are arranged in respective regions between the slots 22 of the stator 20 so that these regions are not covered by the insulating film 30. Removal of the insulating film 30 in these regions can therefore be dispensed with.

Figure 5C:
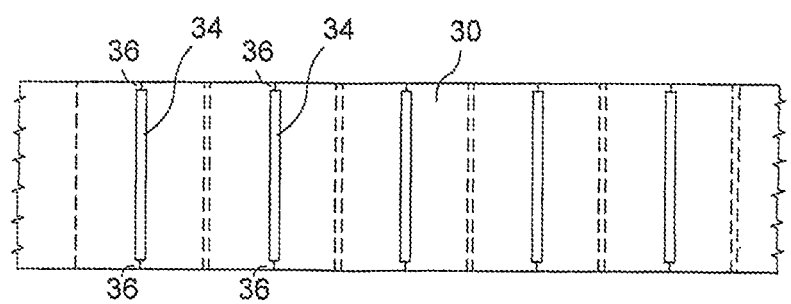

FIG. 5C shows the insulating film 30 in a plan view in a stretched-out state. Here, the position of the cutouts 34 and the side regions 36 can be clearly seen.

The insulating film 30 shown in FIGS. 5A to 5C can also be described as a slotted rosette.

Figure 6A:
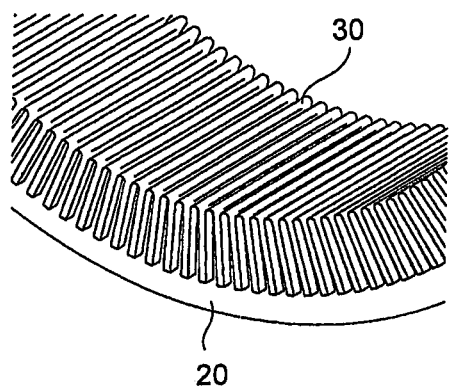
FIG. 6 consists of FIGS. 6A, 6B and 6C, and each show a further insulating film.

FIG. 6A shows in perspective an insulating film 30 on a stator 20 which, in contrast to the embodiment according to FIGS. 5A to 5C, has no cutouts but is designed continuously. This can also be seen in the plan views on a face side of FIGS. 6B and 6C, wherein FIG. 6C shows an enlarged view of part of FIG. 6B. Here, it can also be seen that the insulating film 30 projects radially inward beyond the slots 22, which also persists particularly during the assembly process. This enables damage to electrical conductors of a winding to be prevented.

Figure 6B:
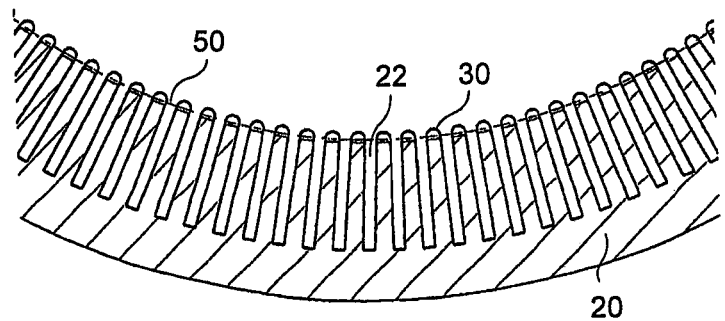
Figure 6C:
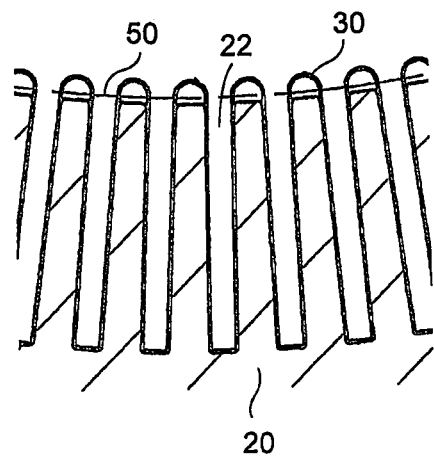

An imaginary rotor diameter 50 of a rotor of an electric motor, of which the stator 20 is to become part, is also shown in FIGS. 6B and 6C and in further figures. As can be seen, the insulating film 30 still projects into the rotor diameter 50 in the state shown in FIGS. 6B and 6C. For this reason, appropriate parts are still to be removed, which is described in detail below.

The insulating film 30 shown in FIGS. 6A to 6C can also be described as a rosette.

Figure 7B:
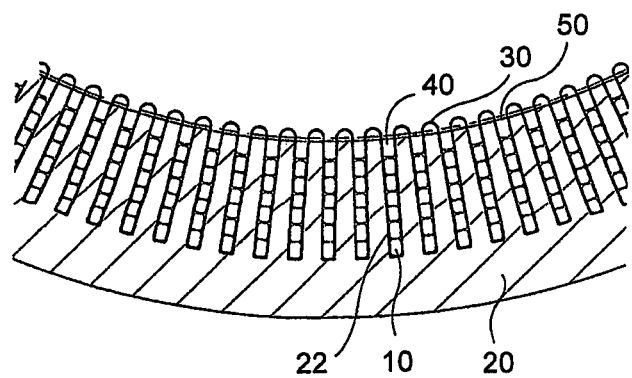
FIG. 7 consists of FIGS. 7B and 7C, and each show a stator with insulating film.
Figure 7C:
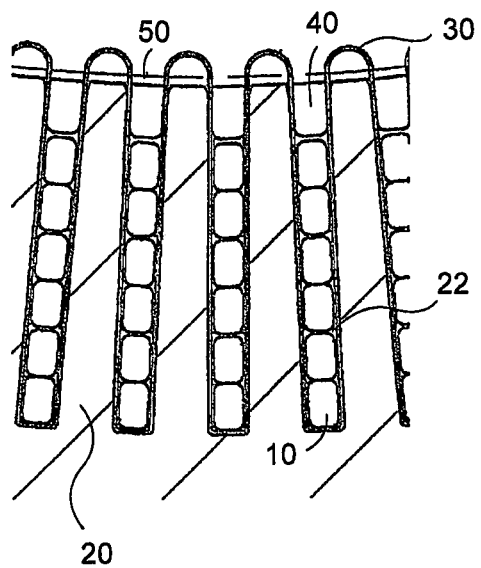

FIG. 7B shows this state in a plan view on a face side of the stator 20; FIG. 7C shows an enlarged section from FIG. 7B.

Furthermore, respective slot covers 40 have been introduced into the slots 22 of the stator 20 in order to seal them radially internally.

Starting from the state shown in FIGS. 7B and 7C, the insulating film 30 can, in particular, be impregnated. This can take place by immersing the stator 20 with the insulating film 30 in a liquid suitable for the purpose. It can also take place by spraying with an impregnating fluid. It must be mentioned that such impregnation can also be carried out in other states, in particular before assembly of the insulating film 30.

As a result of impregnation, the insulating film 30 can be provided with permanent and/or temporary properties. For example, it can be made resistant to chemical attack.

The insulating film 30 can also be hardened by impregnation. In particular, this can simplify further processing as will be described in detail below. Such hardening can take place, for example, after evaporation of a solvent, which can be a constituent of the impregnating fluid.

Figure 8B:
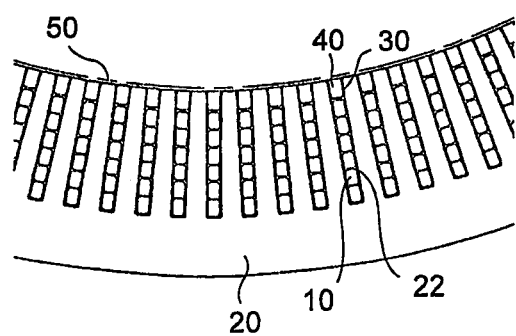
FIG. 8 consists of FIGS. 8B and 8C, and each show a stator with partially removed insulating film.

FIG. 8B shows in plan view the insulating film 30 with stator 20 after removal of radially inwardly projecting parts of the insulating film 30. This can take place in particular in that the hardened insulating film 30, which, as already described, can be achieved in particular by impregnation, is machined, that is to say by milling or grinding for example.

By removing the radially inwardly projecting parts, in particular a gap between a rotor of an electric motor, of which the stator 20 will become part, and the stator 20 can be reduced. As result, the formation of an air gap, which would lead to a reduced efficiency of the electric motor, is reduced or prevented.

Figure 8C:
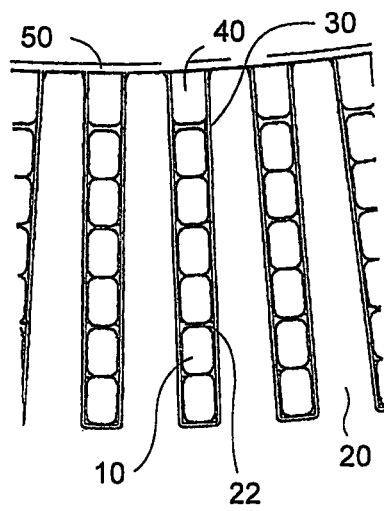

FIG. 8B shows a plan view on a face side of the stator 20; FIG. 8C shows an enlarged view of a section from FIG. 8B.

From FIGS. 8B and 8C in particular, it can be seen that the stator 20 has a smooth curved inner surface even with the insulating film 30 inserted. This enables a rotor diameter 50 to be designed to be very tight-fitting.

The projecting parts of the insulating film can be removed, for example, by precision boring, wherein a milling head used typically has the same diameter as the machining. It can also take place, for example by circular milling, broaching, punching or by laser machining.

The removal of the projecting parts only after impregnation or after insertion of the electrical conductors 10 has the following advantages in particular.

The insulating film 30 can be stiffened by impregnation, which enables better processing.

After impregnation, the stator 20 is protected against the penetration of foreign particles, which can occur when removing the projecting parts.

Also, washing can be carried out in order to remove any dirt particles or processing residues.

Advantageously, with precision boring, any impregnation residue present, for example on teeth, is removed. This enables the power of an electric motor to be increased.

An increase in power can likewise be achieved when precision-boring the stator 20 to an exact diameter, in particular when an inside diameter of the stator 20 is matched to a rotor diameter 50 of a rotor of the electric motor.

The different states in methods according to the invention according to a second exemplary embodiment are described in FIG. 9A to 9D.

Figure 9A:
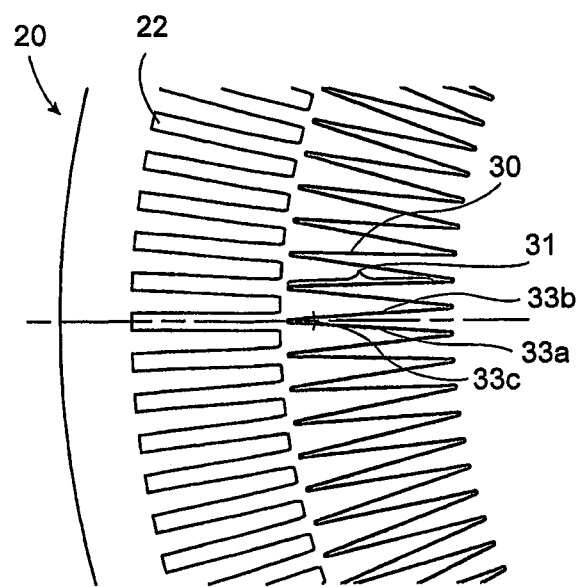
FIG. 9 consists of FIGS. 9A, 9B, 9C and 9D, and each show states in a method according to the invention according to a second exemplary embodiment.

FIG. 9A shows the preparation phase in which the insulating film 30, folded into a V-shape, is arranged in the interior of the stator 20 as fanfold paper. The insulating film 30 has a multiplicity of V-shaped tip regions 31 arranged next to one another which develop on the insulating film 30 in the manner of a rosette, concertina or in a meandering way. Each individual tip region 31 is formed by two legs 33a, 33b which together enclose the tip angle 33c.

Each tip region 31 is positioned in front of a respective slot 22 of the stator 20.

Figure 9B:
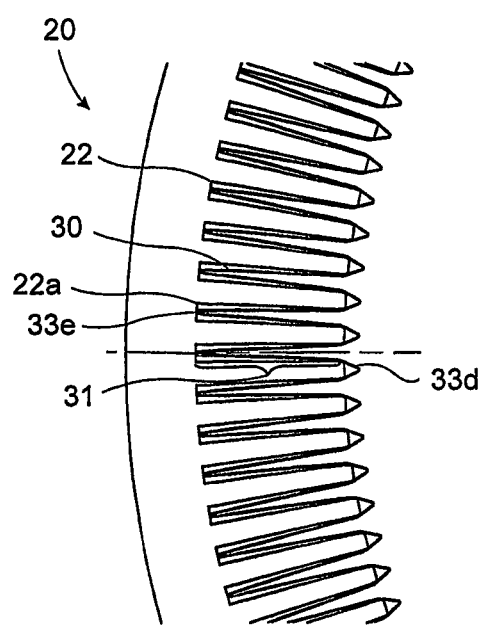

FIG. 9B shows that the whole rosette-like insulating film 30, which has a multiplicity of V-shaped tip regions 31, has been pushed into the respective slots 22. The stator 20 is circular in cross section and has the slots 20 on its inside. The insulating film 30 is pushed outward into the slots 20 in a radial movement. Here, the insertion movement is executed such that the tip 33e rests against the slot bottom 22a. A foot region 33d, which is likewise V-shaped and projects inwardly over the slots 22, is formed between the respective V-shaped tip regions 31. This foot region 33d serves as a connecting region between the respective tip regions 31.

Figure 9C:
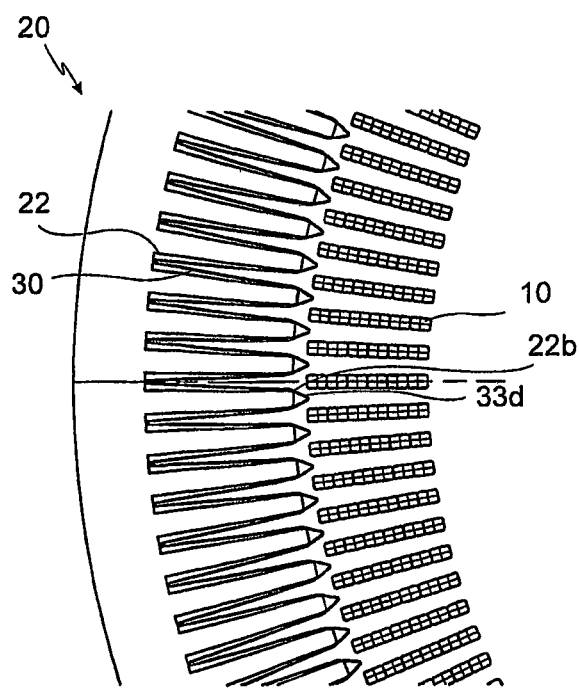

In FIG. 9C, the bundles of electrical conductors 10 are positioned in front of the respective slots 22 and are then pushed into the slots 22 by a radial movement. It can be easily seen that the foot region 33d covers the sharp-edged edge 22b and thus protects the electrical conductors 10.

Figure 9D:
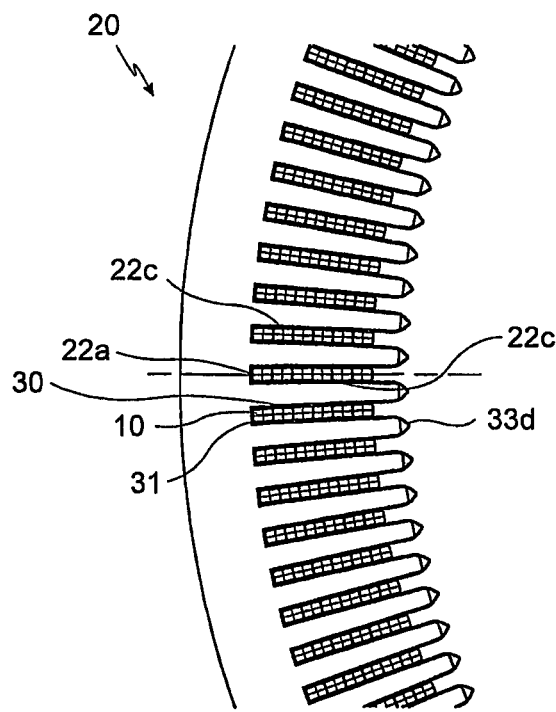

The situation in which the electrical conductors 10 have been pushed into the respective slots 22 is shown in FIG. 9D. From its initial V-shape in cross section, the insulating film 31 is refashioned into a U-shape and now rests against the slot walls 22c and the slot bottom 22a. It is clear that, in the exemplary embodiment shown here, the slot 22 is substantially U-shaped in section and is bounded in a radial direction by two slot walls 22c which are connected by the slot bottom 22a. Radially inward, at a distance from the slot bottom 22a, the slot wall 22c is bounded by the edge or slot edge 22b.

The foot region 33d is smaller compared with FIG. 9C; the projection into the interior of the stator 20 can be folded over or cut off.

Figure 10A:
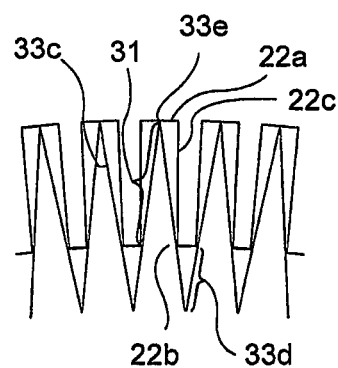
FIG. 10 consists of FIGS. 10A and 10B, and each show a detail of a state according to the second exemplary embodiment in an enlarged view.
Figure 10B:
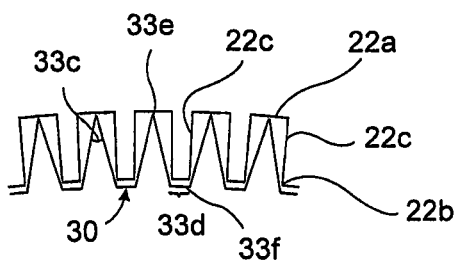

FIG. 10A and FIG. 10B show in two different variants an embodiment of the insulating film 30, the use according to the invention of which is likewise to be considered.

The situation as in FIG. 9B is shown enlarged in FIG. 10A. Reference is made in this regard to the description of FIGS. 9A to 9D.

Compared with these, FIG. 10B shows a somewhat different embodiment of the insulating film 30, as the respective V-shaped tip regions 31 are connected by connecting pieces 33f, which run in the circumferential direction in the installed situation, as foot region 33d. The foot region 33d, as the region projecting inwardly over the slot 22, is then trough or U-shaped.

Figure 11:
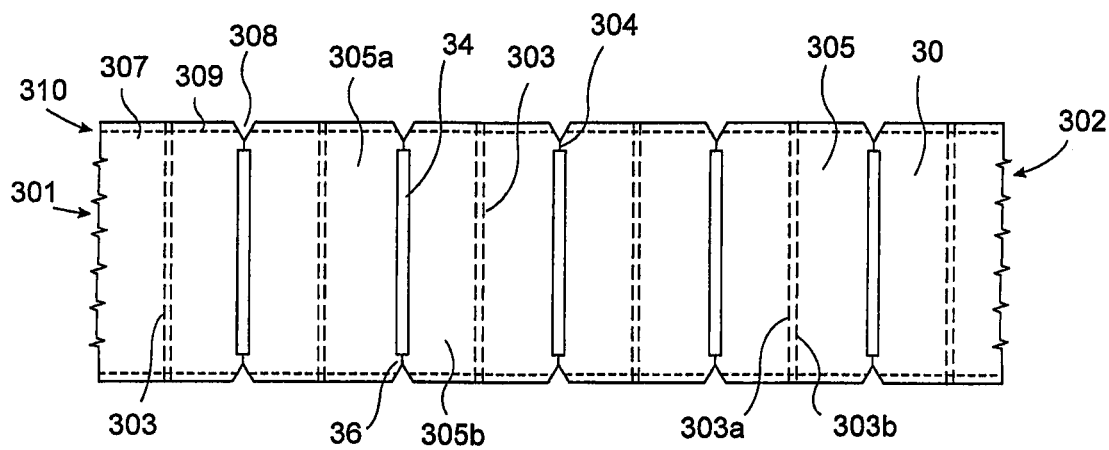
FIG. 11 shows a further exemplary embodiment of the insulating film according to the invention in plan view.

A further exemplary embodiment of the insulating film 30 according to the invention is shown in FIG. 11. Although in this view the insulating film 30 is shown as a section, it is not infinitely long but has a leading edge 301 and a trailing edge 302 which are not visible here. The material is a classic web material which is made-to-measure and thus forms the respective leading edge 301 and trailing edge 302 at its ends. The leading edge 301 and trailing edge 302 terminate the insulating film at its longitudinal ends.

A multiplicity of fold lines 303 are provided at right angles to the longitudinal extension of the insulating film 30 shown here. In the exemplary embodiment shown here, two fold lines 303a and 303b are arranged close to one another and afterwards result in a U-shaped form in the slot. It is clear that, if only one fault line 303 is provided (see left-hand field), a V-shaped tip region 31 is produced. A cutout 34 is located between two fold lines 303. The bending line 304 is also located in the region of the cutout 34. A side region 36, which joins the insulating film regions 305a and 305b together, in each case remains above and below next to the cutout 34. In the installed situation, the inflection line 36 lies on the slot tooth.

The exemplary embodiment shown here also shows a reinforcing edge 307 which is connected laterally outside the side regions 36 to the insulating film regions 305 which project into the slots. A notch 308 is provided in the region of the cutout 34. Here, the reinforcing edge 307 is folded about the bend line 309 in order to produce a double-layered reinforcement 310, which simplifies the guidance of this insulating film 30. The reinforcement 310 then projects above and below the stator, for example, or is just flush therewith. Both possibilities are included in the invention.

Possible characteristics of the proposal are reproduced in structured form below. The following characteristics, which are reproduced in structured form, can be combined with one another in any way and can be incorporated into the claims of the application in any combination. The person skilled in the art will be clear that the invention ensues from the subject matter with the fewest characteristics. In particular, advantageous or possible embodiments, but not the only possible embodiments of the invention, are reproduced below.

The invention comprises:

A method for introducing insulating film and at least one electrical conductor into at least one slot of a component, for example a stator for an electrical machine, which has the sequence of the following steps:

Introduction of an insulating film into the at least one slot so that respective edges of the slot are covered by the insulating film, and Introduction of a number of electrical conductors into the slot.

The above-mentioned method, wherein, during the step of introducing an insulating film, the insulating film is only introduced into the slot to such an extent that it is at a distance from a bottom of the slot.

The above-mentioned method, wherein, during the step of introducing a number of electrical conductors, the insulating film is pushed to the bottom of the respective slot by the electrical conductors.

The above-mentioned method, wherein a separate insulating film is introduced into each slot.

The above-mentioned method, wherein the insulating film is pre-formed, in particular pre-folded, before it is introduced into the slot.

The above-mentioned method, wherein insulating films which have been introduced into adjacent slots overlap between these slots.

The above-mentioned method, wherein, after the introduction thereof, the insulating films are held fast between respective slots.

The above-mentioned method, wherein the insulating films are released during the introduction of the electrical conductors to enable them to pass further into the respective slot.

The above-mentioned method, wherein, during the step of introducing an insulating film, the insulating film is introduced as far as the bottom of the slot.

The above-mentioned method, wherein a common insulating film is introduced into a plurality of slots, preferably all slots of the component.

The above-mentioned method, wherein the insulating film is designed as fanfold paper.

The above-mentioned method, wherein, after the introduction thereof, preferably also after the introduction of the electrical conductors, the common insulating film is cut.

The above-mentioned method, wherein, after the step of introducing the electrical conductor, the insulating film is folded so that it is located completely within the respective slot.

The above-mentioned method, wherein the cutting of the common insulating film and the folding of the insulating films are carried out in one operation, in particular by means of a single tool.

The above-mentioned method, wherein the stator is round and the insulating films and the electrical conductors are introduced radially from the inside to the outside According to a development, after the step of introducing the electrical conductor, in particular after folding the insulating film in the slot, the method further has the following step:

Introduction of a respective slot cover into the slot, wherein the slot cover covers the electrical conductors introduced into the slot.

The above-mentioned method, wherein the respective slot cover seals the slot.

The above-mentioned method, wherein the slot covers are inserted axially.

The above-mentioned method, wherein the insulating film is introduced in the form of a slotted rosette.

The above-mentioned method, wherein, after the introduction thereof, the insulating film is stiffened and parts which lie outside the slots are removed by a machining process.

The invention further relates to a device for introducing electrical conductors (10) into slots (22) of a component, for example a stator (20) for an electric motor, wherein the device (100) has a number of slot pushers (110) for introducing electrical conductors (10) into the slots (22) and a number of guide elements (120) arranged between the slot pushers (110) for laterally guiding the electrical conductors (10) during their introduction. In particular, the device can be designed to carry out an above-mentioned method.

The above-mentioned device, wherein the slot pushers (110) can be moved radially with respect to a common axis.

The above-mentioned device, wherein the guide elements (120) can be moved radially or parallel to surrounding slot pushers (110) in order to hold or release insulating films (30) between the slots (22).

The invention further relates to a cutting tool which has a base body (205), a first cutting knife (210) and a second cutting knife (220), wherein the first cutting knife (210) and the second cutting knife (220) project from the base body (205) so that they are constructed to cut through a common insulating film (30) adjacent to a slot (20) of a component (10) along two adjacent, parallel cutting lines.

The above-mentioned cutting tool, wherein the cutting tool (200) is further designed to fold parts of the insulating film (30) resulting from the cutting process into the slot (20) after cutting.

The above-mentioned cutting tool, wherein the cutting tool (200) is part of an above-mentioned device (100).

The invention further relates to a use of an insulating film for covering edges of a slot formed in a component, in particular a stator for an electrical machine, while introducing electrical conductors into the slot.

The above-mentioned use, wherein the insulating film is pre-formed, in particular pre-folded.

The above-mentioned use, wherein the insulating film is provided for a plurality of slots, wherein, in particular, it is folded in a meandering manner.

The above-mentioned use, wherein the insulating film is provided for one slot, wherein, in particular, it is folded in a top-hat shape.

The claims submitted now with the application and claims submitted later are without prejudice for the achievement of further protection.

If on closer inspection here, particularly also of the relevant prior art, it should be found that one or other characteristic, although favorable for the object of the invention, is however not of decisive importance, then, of course, a formulation which no longer features such a characteristic, particularly in the main claim, is sought at this stage. Such a sub-combination is also covered by the disclosure of this application.

It must further be noted that the embodiments and variants of the invention described in the various embodiments and shown in the figures can be combined with one another at will. In doing so, individual or several characteristics can be interchanged as required. These combinations of characteristics are likewise disclosed.

The counter-references stated in the dependent claims refer to the further embodiment of the subject matter of the main claim by way of the characteristics of the respective sub-claim. However, these are not to be understood as a renunciation of the achievement of independent, objective protection for the characteristics of the referenced sub-claims.

Characteristics which have been disclosed only in the description, and also individual characteristics from claims which include a multiplicity of characteristics, may be incorporated into the independent claim/claims at any time as being of significance essential to the invention for differentiation from the prior art, including when such characteristics have been mentioned in conjunction with other characteristics or achieve particularly favorable results in conjunction with other characteristics.

The invention claimed is:

1. A method for introducing a plurality of insulating films and a plurality of electrical conductors into a plurality of slots of a component, which has a sequence of following steps:
   pre-forming each of the plurality of insulating films into sectionally a top-hat shape;
   inserting each of the insulating films into each of the slots so that respective edges of each of the slots are covered by the insulating film and outward folded portions of the insulating film cover regions of the component between adjacent slots;
   wherein the insulating films after being inserted into the adjacent slots, the outward folded portions of the insulating films overlap each other so that the outward folded portions allow a plurality of movable guide element to push and grip the outward folded portions firmly against the regions of the component between the adjacent slots; and simultaneously introducing the plurality of the electrical conductors into each of the slots while releasing the movable guide elements against the insulating films to enable the electrical conductors to move further into the respective slots and simultaneously moving each of the insulating films and the electrical conductors to respective end positions;

wherein a separate insulating film is introduced into each slot.

2. The method according to claim 1, wherein, during the step of introducing the insulating film, the insulating film is only introduced into the slot to such an extent that it is at a distance from a bottom of the slot.

3. The method according to claim 1, wherein, during the step of introducing the electrical conductors, the insulating film is pushed to a bottom of the respective slot by the electrical conductors.

4. The method according to claim 1, wherein, during the step of introducing an insulating film, the insulating film is introduced as far as a bottom of the slot.

5. The method according to claim 1, wherein, after the step of introducing the electrical conductor, the insulating film is folded so that it is located completely within the respective slot.

6. The method according to claim 1, wherein, after the step of introducing the electrical conductor there is a further step of then introducing a respective slot cover into the slot, wherein the slot cover covers the electrical conductors which were introduced into the slot.

7. The method according to claim 1, wherein the insulating film is introduced in the form of a slotted rosette.

8. The method according to claim 1, wherein, after introducing, the insulating film it is stiffened and parts which lie outside the slots are removed by a machining process.

9. A device for introducing electrical conductors into slots of a component, wherein the device has a number of slot-pushers for introducing electrical conductors into the slots and a number of guide elements arranged between the slot-pushers for laterally guiding the electrical conductors during their introduction, and the device is designed to carry out the method of claim 1.

10. The method according to claim 1, wherein the component is for an electric machine.

11. The method according to claim 6, wherein the introducing the receptive slot cover is performed after inserting the insulating film in the slot.

12. The method according to claim 1, wherein the component is a stator for an electric motor and the guide element moves radially.

13. The method according to claim 1, wherein there are a plurality of the guide elements, and there are a plurality slot-pushers for introducing electrical conductors into the slots; and wherein the guide elements are arranged between the slot-pushers for laterally guiding the electrical conductors during their introduction into the slots.

14. The method according to claim 1, wherein, during the step of introducing the insulating film, the insulating film is only introduced into the slot to such an extent that it is at a distance from a bottom of the slot;

wherein, during the step of introducing the electrical conductors, the insulating film is pushed to the bottom of the respective slot by the electrical conductors; and wherein the component is a stator for an electric motor and the guide element moves radially.

* * * * *